(12) United States Patent
Hirota et al.

(10) Patent No.: US 10,535,194 B2
(45) Date of Patent: Jan. 14, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Yuichiro Hirota, Tokyo (JP); Akihiro Katayama, Tokyo (JP); Masakazu Fujiki, Kawasaki (JP); Daisuke Kotake, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 27 days.

(21) Appl. No.: 15/389,206

(22) Filed: Dec. 22, 2016

(65) Prior Publication Data

US 2017/0186237 A1     Jun. 29, 2017

(30) Foreign Application Priority Data

Dec. 28, 2015 (JP) ................. 2015-257146

(51) Int. Cl.
*G06T 19/00* (2011.01)
*G06T 7/20* (2017.01)

(52) U.S. Cl.
CPC .............. *G06T 19/006* (2013.01); *G06T 7/20* (2013.01); *G06T 2207/30244* (2013.01)

(58) Field of Classification Search
CPC ................. G06T 19/006; G06T 7/20; G06T 2207/30244
See application file for complete search history.

(56) References Cited

U.S. PATENT DOCUMENTS

| | | | | |
|---|---|---|---|---|
| 2014/0016825 A1* | 1/2014 | Kasahara | ............... | G06T 11/00 382/103 |
| 2014/0152657 A1* | 6/2014 | Johnston | ................ | G06F 3/011 345/419 |
| 2015/0356788 A1* | 12/2015 | Abe | ..................... | A63F 13/428 345/633 |

FOREIGN PATENT DOCUMENTS

JP          3793158 B2       7/2006

* cited by examiner

*Primary Examiner* — Samantha (Yuehan) Wang
(74) *Attorney, Agent, or Firm* — Canon U.S.A., Inc. IP Division

(57) ABSTRACT

Whether a reference map can be changed is determined based on an index for evaluating a user's unlikeliness to notice a change in an appearance of a virtual object in an image captured by a camera, the change occurring when the reference map is changed to another map.

17 Claims, 8 Drawing Sheets

INFORMATION PROCESSING APPARATUS, INFORMATION PROCESSING METHOD, AND STORAGE MEDIUM

BACKGROUND

Field

The present disclosure relates to an information processing apparatus, an information processing method, and a program, and more particularly to ones suitably used to superimpose and display a virtual object on an image captured by an imaging apparatus.

Description of the Related Art

There is a mixed reality (MR) technology. The MR technology is a technology that uses a camera and a device implementing a display, such as a head-mounted display (HMD) and a tablet personal computer (PC), to superimpose a virtual object on an image captured by the camera and display the resultant on the display.

In the MR technology, a superimposing position of the virtual object in the image is usually determined by using a position and orientation of the camera, which is estimated by associating the image captured by the camera with a map representing a spatial arrangement of an index being associated with an index in the image in the scene. In general, the map and the processing for associating the map with the image captured by the camera include errors. The position and orientation of the camera estimated by associating the map with the image captured by the camera therefore contains errors. Such errors can change the superimposing position of the virtual object and give a sense of incongruity to the user. Japanese Patent No. 3793158 discusses a technique for correcting the superimposing position of the virtual object in consideration of a time-series history of the position and orientation of the camera.

Errors in the processing for associating the map with the image captured by the camera cause changes in a display position of the virtual object with relatively high frequency. Such changes can be suppressed by the technique discussed in Japanese Patent No. 3793158. On the other hand, a change in the display position of the virtual object due to a change of the map to be referred to during association occurs sporadically. The technique discussed in Japanese Patent No. 3793158 is therefore not able to remove such a change in the display position of the virtual object, and a sense of incongruity may be given to the user when the map is changed.

SUMMARY

The present disclosure is directed to reducing a sense of incongruity given to the user when the map referred to to determine the superimposing position of the virtual object on the captured image is changed.

According to an exemplary embodiment, an information processing apparatus for performing processing for superimposing a virtual object on an image captured by an imaging apparatus based on a result of association between a map and the image, the map representing an arrangement of an index being associated with an index included in an image which is captured, includes a determination unit configured to determine whether the map is able to be changed, based on an appearance of the virtual object superimposed on the image captured by the imaging apparatus; and a changing unit configured to change the map in case where the determination unit determines that the map is able to be changed.

According to another exemplary embodiment, an information processing apparatus for performing processing for superimposing a virtual object on an image captured by an imaging apparatus based on a result of association between a map and the image, the map representing an arrangement of an index being associated with an index in an image which is captured, includes a determination unit configured to determine whether the map is able to be changed, based only on a temporal change in a position and orientation of the imaging apparatus; and a changing unit configured to change the map in case where the determination unit determines that the map is able to be changed.

Further features will become apparent from the following description of exemplary embodiments with reference to the attached drawings.

DESCRIPTION OF THE EMBODIMENTS

Before describing exemplary embodiments, an example of a configuration of hardware that implements an information processing apparatus described in each exemplary embodiment will be described with reference to FIG. 1.

Figure 1:
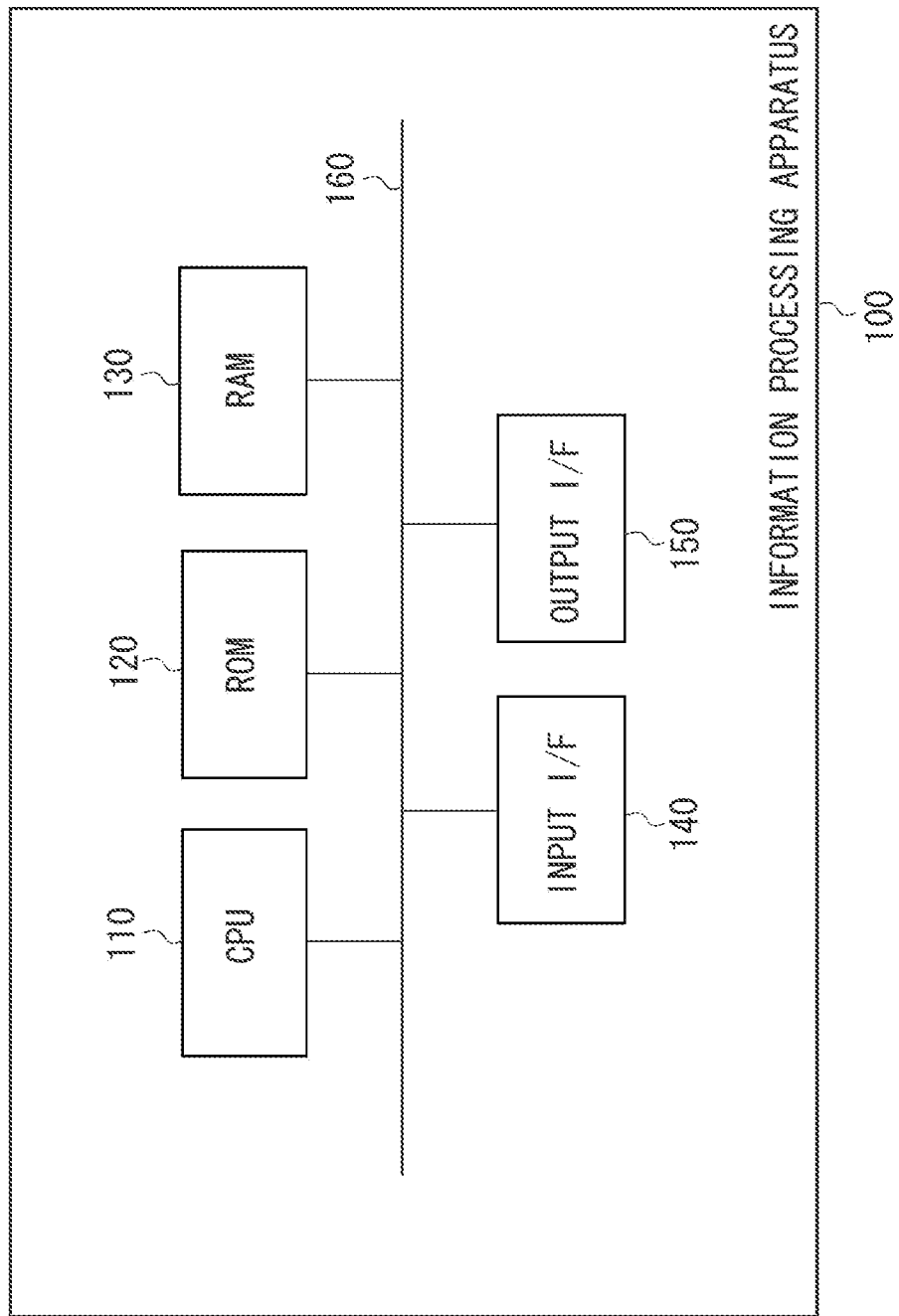
FIG. 1 is a diagram illustrating a configuration of hardware of an information processing apparatus.

FIG. 1 is a diagram illustrating an example of a configuration of hardware of an information processing apparatus 100. In FIG. 1, a central processing unit (CPU) 110 controls devices connected to a bus 160 in a centralized manner. The CPU 110 reads and executes processing steps and programs stored in a read-only memory (ROM) 120. For example, various processing programs and device drivers according to the present exemplary embodiment, including an operating system (OS), are stored in the ROM 120. The CPU 110 temporarily stores the processing programs and device drivers stored in the ROM 120 into a random access memory (RAM) 130, and executes the processing programs and device drivers. An input interface (I/F) 140 inputs an input signal from an external apparatus (such as a display and an operation device) in a format processable by the information processing apparatus 100. An output I/F 150 outputs an output signal to an external apparatus (display) in a format processable by the apparatus.

Next, a first exemplary embodiment will be described.

In the present exemplary embodiment, an MR system that uses simultaneous localization and mapping (SLAM) for simultaneously performing generation of a map and calculation of a position and orientation of a camera will be described as an example. In SLAM, the generation and update of a map are sporadically performed. In the present exemplary embodiment, when generating a new map, the information processing apparatus 100 determines whether a change in a display position of a virtual object, occurring from switching of maps is unnoticeable to a user. If the change is determined to be unnoticeable to the user, the information processing apparatus 100 immediately switches the map to be referred to to the generated new map. On the other hand, if the change is determined to be noticeable to the user, the information processing apparatus 100 stores the new map without switching the maps. After a lapse of a certain time, the information processing apparatus 100 determines again whether the change is unnoticeable to the user. Such switching of maps in timing when the user is unlikely to notice a change in the display position of the virtual object can reduce a sense of incongruity given to the user.

In the present exemplary embodiment, to determine whether a change in the display position of the virtual object is unnoticeable to the user, the information processing apparatus 100 obtains field of view information which represents an appearance of the virtual object as seen from the point of view of a camera. Based on the field of view information, the information processing apparatus 100 then determines whether the virtual object is included in the field of view of the camera. If the virtual object is not included, the information processing apparatus 100 determines that the map to be referred to can be changed. Details of the present exemplary embodiment are described below.

Figure 2:
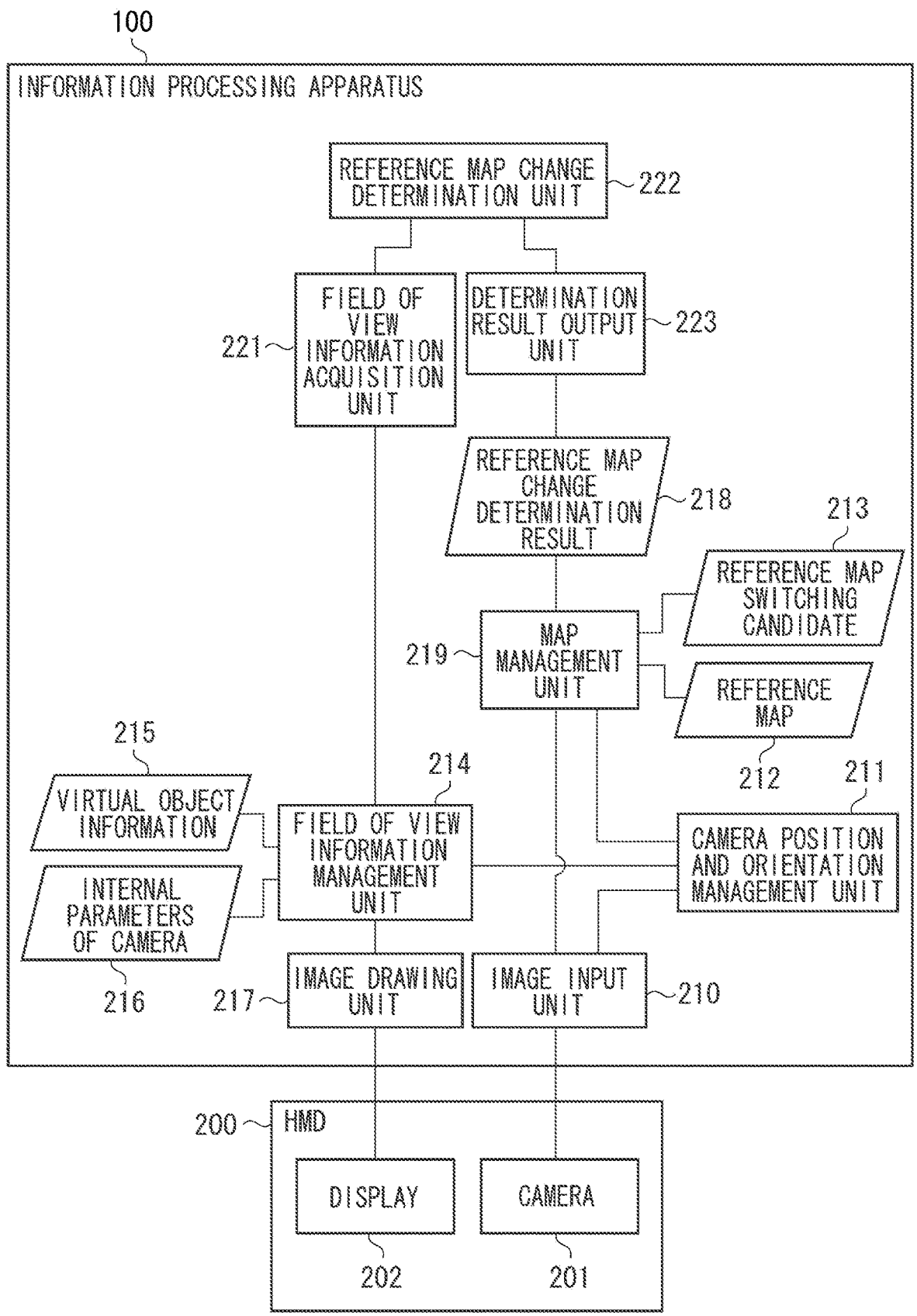
FIG. 2 is a diagram illustrating a first example of a configuration of a mixed reality (MR) system.

FIG. 2 is a diagram illustrating an example of a module configuration of the information processing apparatus 100 according to the present exemplary embodiment and the MR system in which the information processing apparatus 100 is implemented.

An HMD 200 includes a camera 201 and a display 202. The user wears the HMD 200 and moves freely in an MR experience space. In the meantime, an image input unit 210 sequentially receives frame images continuously captured by the camera 210. A camera position and orientation management unit 211 associates a reference map 212, which is the map currently referred to, with a frame image received by the image input unit 210 to calculate a position and orientation of the camera 201 at the imaging time of the frame image. In the present exemplary embodiment, a map includes three-dimensional points representing surfaces of objects lying around and luminance information about pixels in a predetermined range around the three-dimensional points in the image in which the three-dimensional points are observed.

A field of view information management unit 214 manages and sequentially passes the field of view information to an image drawing unit 217 and the information processing apparatus 100 (field of view acquisition unit 221). The field of view information includes at least either one of geometric information and optical information for determining the appearance of the virtual object to the camera 201. For example, the field of view information includes the position and orientation of the camera 201 obtained from the camera position and orientation management unit 211, virtual object information 215, and internal parameters 216 of the camera 201. The virtual object information 215 includes a position and orientation of the virtual object, shape information (such as vertex information which is information indicating vertexes of polygons expressing a shape, and surface information which is information indicating surfaces of the polygons), and optical information (such as transparency of the virtual object).

The image drawing unit 217 generates an image by superimposing the virtual object on the frame image received from the image input unit 210 based on the field of view information received from the field of view information management unit 214, and outputs the generated image to the display 202. The foregoing series of processes up to the drawing of the image to the display 202 is performed in real time on each of the frame images continuously transmitted from the camera 201. Meanwhile, a map management unit 219 generates a map by using a plurality of stored frame images obtained from the image input unit 210, and the position and orientation of the camera 201 corresponding to each frame image, obtained from the camera position and orientation management unit 211.

The map management unit 219 stores the generated map as a reference map switching candidate 213. When generating a map, the map management unit 219 initially calculates, by the principle of triangulation, the positions of the three-dimensional points of characteristic pixels that can be associated between a plurality of frame images. The map management unit 219 then attaches luminance information about a predetermined range around the three-dimensional points in the frame image having the latest imaging time among the plurality of frame images in which the three-dimensional points are observed, to the positions of the three-dimensional points and stores the resultant as a matrix. The map management unit 219 checks a reference map change determination result 218 which is output by the information processing apparatus 100. If the reference map change determination result 218 indicates that the map can be switched, the map management unit 219 updates the reference map 212 with the reference map switching candidate 213.

The information processing apparatus 100 according to the present exemplary embodiment includes the field of view information acquisition unit 221, a reference map change determination unit 222, and a determination result output unit 223. The field of view information acquisition unit 221 obtains the position and orientation of the camera 201, the virtual object information 215, and the internal parameters 216 of the camera 201 as the field of view information from the field of information management unit 214. Based on the field of view information, the reference map change determination unit 222 determines whether the map currently referred to (reference map 212) can be changed. The determination result output unit 223 outputs the latest result of determination made by the reference map change determination unit 222 as the reference map change determination result 218.

FIG. 2 illustrates an example where the image input unit 210, the camera position and orientation management unit 211, the field of view information management unit 214, and the image drawing unit 217 are included in the information processing apparatus 100. However, at least some of these units may be included in an apparatus other than the information processing apparatus 100 (for example, the HMD 200).

Figure 3:
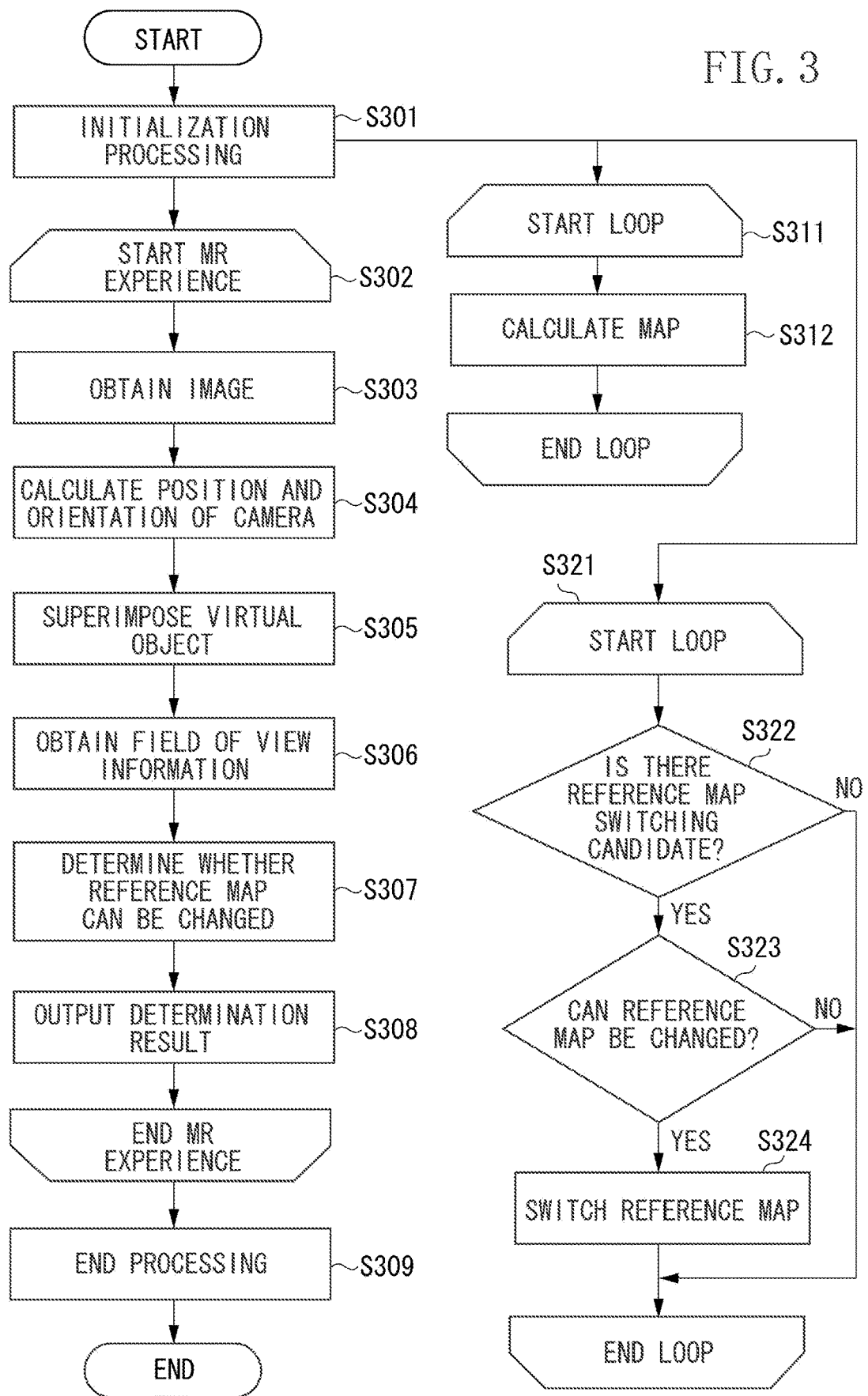
FIG. 3 is a flowchart illustrating a first example of processing of the MR system.

Next, an example of processing of the MR system will be described in detail with reference to the flowchart of FIG. 3.
(Step S301)

In step S301, initialization processing of the MR system is performed. Specifically, the user previously arranges a marker board which can be automatically detected from an image and on which feature points are arranged with known dimensions, in a scene in which the MR system is used. The user makes an operation on the camera 201 of the HMD 200 to capture an image of the marker board. The map management unit 219 obtains the image captured by the camera 201 based on the operation. The map management unit 219 calculates the three-dimensional positions of the feature points on the marker board from the obtained image as the positions of the three-dimensional points, and sets the positions of the three-dimensional points and luminance information about surrounding pixels as an initial reference map 212. The information processing apparatus 100 activates loop processing of and after step S311 for executing map calculation processing, and loop processing of and after step S321 for executing map switching processing. The loop processing of and after step S311 and the loop processing of and after step S321 are executed asynchronously with the processing of steps S301 to S309. The HMD 200 obtains the virtual object information 215 and the internal parameters 216 of the camera 201 from a previously-stored memory area.

(Step S302)

Step S302 is loop processing to be repeatedly performed thereafter until the user ends the MR experience. The loop processing is executed at a frame rate such that the user can discern the processing of steps S303 to S308 in real time.

(Step S303)

In step S303, the image input unit 210 obtains an image from the camera 201 of the HMD 200.

(Step S304)

In step S304, the camera position and orientation management unit 211 associates the image obtained in step S303 with the reference map 212 to calculate the position and orientation of the camera 201 when the image is captured. A specific example will be described. The camera position and orientation management unit 211 multiplies the three-dimensional points and the luminance information nearby, stored in the reference map 212, by a position and orientation of the camera 201 and an internal parameter matrix of the camera 201. The camera position and orientation management unit 211 thereby superimposes the luminance information (luminance values) on a region corresponding to a region in which the luminance information exists, among regions of the image obtained in step S303. The camera position and orientation management unit 211 calculates, by optimization calculation, the position and orientation of the camera 201 that minimizes the sum of differences between the luminance values of the pixels of the two regions.

(Step S305)

In step S305, the image drawing unit 217 generates an image by superimposing the virtual object on the image obtained in step S303, and outputs the generated image to the display 202 of the HMD 200. A specific example will be described. The image drawing unit 217 initially receives the position and orientation of the camera 201 calculated in step S304 and the virtual object information 215 from the field of view information management unit 214. The image drawing unit 217 calculates a relative position and orientation of the virtual object with respect to the camera 201 based on the position and orientation of the camera 201 and the position and orientation of the virtual object. The image drawing unit 217 then multiplies the shape information about the virtual object by the relative position and orientation of the virtual object and the internal parameter matrix of the camera 201 to determine the display position of the virtual object in the image captured by the camera 201. The image drawing unit 217 then performs rendering in the determined position according to the optical information about the virtual object.

(Step S306)

In step S306, the field of view information acquisition unit 221 obtains the following pieces of information from the field of view information management unit 214 as the field of view information for determining the appearance of the virtual object as seen from the point of view of the camera 201. That is, the field of view information acquisition unit 221 obtains the position and orientation of the camera 201, the virtual object information 215, and the internal parameters 216 of the camera 201.

(Step S307)

In step S307, the reference map change determination unit 222 determines whether the reference map 212 can be changed, based on the field of view information obtained in step S306. Here, the field of view information obtained in step S306 includes the position and orientation of the camera 201, the position and orientation of the virtual object, the shape information about the virtual object (vertex information about polygons), and the internal parameters 216 of the camera 201. In the present exemplary embodiment, if the virtual object is not included in the field of view (imaging range) of the camera 201 from the point of view of the camera 201 when the image is captured, the reference map change determination unit 222 determines that the reference map 212 can be changed. If not, the reference map change determination unit 222 determines that the reference map 212 is not able to be changed.

A specific example will be described. The reference map change determination unit 222 initially calculates the relative position and orientation of the virtual object with respect to the camera 201 based on the position and orientation of the camera 201 and the position and orientation of the virtual object. The reference map change determination unit 222 multiplies three-dimensional coordinates of each vertex of the polygons expressing the shape of the virtual object by the relative position and orientation of the virtual object and the internal parameters 216 of the camera 201. The reference map change determination unit 222 thereby calculates a two-dimensional position of each vertex of the virtual object on a camera image projection plane (plane of projection of the image captured by the camera 201). If none of the two-dimensional positions of the vertexes of the virtual object on the cameral image projection plane falls within the field of view of the camera 201, the reference map change determination unit 222 determines that the reference map 212 can be changed. If any, the reference map change determination unit 222 determines that the reference map 212 is not able to be changed. The reference map change determination unit 222 stores the determination result.

(Step S308)

In step S308, the determination result output unit 223 outputs the determination result of step S307 to a memory area where the reference map change determination result 218 is stored.

(Step S309)

In step S309, end processing of the MR system is performed. Specifically, the information processing apparatus 100 ends the loop processing of and after step S311 and the loop processing of and after step S321. The information processing apparatus 100 frees the resources reserved in executing the programs for performing the flowchart illustrated in FIG. 3.

Next, an example of the loop processing of and after step S311, representing the map calculation processing activated in step S301, will be described.

(Step S311)

Step S311 is loop processing to be repeatedly performed after processing is activated in step S301, until the end processing of step S309 is executed.

(Step S312)

In step S312, the map management unit 219 calculates a map with reference to pairs of a predetermined number of images obtained and stored in step S303 and the positions and orientations of the camera 201 corresponding to the respective images, calculated in step S304. The map management unit 219 outputs the calculated map to a memory area storing the reference map switching candidate 213.

Next, an example of the loop processing of and after step S321, representing the map switching processing activated in step S301, will be described.
(Step S321)

Step S321 is loop processing to be repeatedly performed after processing is activated in step S301, until the end processing of step S309 is executed.
(Step S322)

In step S322, the map management unit 219 checks the memory area storing the reference map switching candidate 213 to determine whether there is a reference map switching candidate 213. If there is a reference map switching candidate 213 (YES in step S322), the processing proceeds to step S323. If there is no reference map switching candidate 213 (NO in step S322), the processing returns to the beginning (step S321) of the loop processing. The map management unit 219 performs the loop processing again after a wait of certain time.
(Step S323)

In step S323, the map management unit 219 checks the memory area storing the reference map change determination result 218 to determine whether the reference map 212 can be changed. If the reference map 212 is determined to be able to be changed (YES in step S323), the processing proceeds to step S324. On the other hand, if the reference map 212 is not able to be changed (NO in step S323), the processing returns to the beginning of the loop processing (step S321). The map management unit 219 performs the loop processing again after a wait of certain time.
(Step S324)

In step S324, the map management unit 219 switches the reference map 212. A specific example will be described. The map management unit 219 sets the map stored as the reference map switching candidate 213 to be the reference map 212, and then clears the memory area storing the reference map switching candidate 213.

As described above, in the present exemplary embodiment, whether the reference map 212 can be changed is determined based on whether the virtual object is included in the field of view of the camera 201. This can reduce the sense of incongruity given to the user due to a change occurring in the display position of the virtual object when the reference map 212 is switched during MR experience.
[Modification 1-1]

The present exemplary embodiment has described an example where, in step S307, the reference map 212 is determined to be changed if the virtual object is not included in the field of view of the camera 201. However, this is not necessarily restrictive. Whether to change the reference map 212 may be determined based on the ratio of (the area of) the display region of the virtual object to (the area of) the image captured by the camera 201 on which the virtual object is superimposed. The smaller the ratio of the display region of the virtual object to the image captured by the camera 201 is, the less likely the user is to notice a change occurring in the position of the virtual object when the reference map 212 is changed. Changing the reference map 212 when the ratio of the display region of the virtual object to the image captured by the camera 201 is small therefore provides the following effect. That is, even if the virtual object lies in the field of view of the camera 201 for a long period of time, the reference map 212 can be changed in timing when a sense of incongruity given to the user is relatively small.

Next, an example of the processing of step S307 different from that of the foregoing first exemplary embodiment will be described as processing of the information processing apparatus 100 according to the present modification.
(Step S307)

In step S307, the reference map change determination unit 222 determines whether the reference map 212 can be changed, based on the field of view information obtained in step S306. Here, the position and orientation of the camera 201, the position and orientation of the virtual object, the shape information about the virtual object (vertex information and surface information about polygons), and the internal parameters 216 of the camera 201 are used as the field of view information obtained in step S306. In the present modification, if the ratio of the display region of the virtual object to the image captured by the camera 201 is smaller than a predetermined value, the reference map change determination unit 222 determines that the reference map 212 can be changed. If not, the reference map change determination unit 222 determines that the reference map 212 is not able to be changed. The reference map change determination unit 222 stores the determination result.

A specific example will be described. The reference map change determination unit 222 initially calculates the relative position and orientation of the virtual object with respect to the camera 201 based on the position and orientation of the camera 201 and the position and orientation of the virtual object. The reference map change determination unit 222 multiplies the surface information about each surface of the polygons expressing the shape of the virtual object by the relative position and orientation of the virtual object and the internal parameter matrix of the camera 201 to project the virtual object onto the camera image projection plane. The reference map change determination unit 222 then counts the number of pixels where the surfaces of the polygons of the virtual object exist in the region of the field of view range of the camera 201 on the camera image projection plane. The counted total number of pixels is assumed to be the area of the display region of the virtual object. The reference map change determination unit 222 calculates the ratio of the obtained area to all the pixels of the image captured by the camera 201. If the calculated ratio is smaller than or equal to a predetermined value, the reference map change determination unit 222 determines that the reference map 212 can be changed. If not, the reference map change determination unit 22 determines that reference map 212 is not able to be changed.

As described above, according to the present modification, the reference map 212 is determined to be able to be changed if the ratio of the display region of the virtual object to the image captured by the camera 201 is small. Consequently, even if the virtual object remains constantly in the field of view of the camera 201, the reference map 212 can be switched in timing when a sense of incongruity given to the user is relatively small.
[Modification 1-2]

In the present exemplary embodiment and modification 1-1, whether the reference map 212 can be changed is described to be determined based on the geometric appearance of the virtual object in the point of view of the camera 201 as the appearance of the virtual object. However, the appearance of the virtual object is not limited thereto. Whether the reference map 212 can be changed may be determined based on an appearance taking account of not only the geometric appearance of the virtual object but the optical appearance of the virtual object as well. The reference map 212 can thus be changed by identifying a situation where the user is unlikely to notice a change in the display position of the virtual object (for example, where the virtual object superimposed on the image captured by the camera 201 blends well into the background image). In the present modification, a method for determining blending of the virtual object into the background image based on the magnitude of a luminance gradient of the image will be described as an example.

An example of the processing of step S307 different from that of the foregoing first exemplary embodiment will be described below as processing of the information processing apparatus 100 according to the present modification.

(Step S307)

In step S307, the reference map change determination unit 222 determines whether the reference map 212 can be changed, based on the field of view information obtained in step S306 and the image captured by the camera 201. Here, the position and orientation of the camera 201, the position and orientation of the virtual object, the shape information (vertex information and surface information about polygons), the optical information about the virtual object, and the internal parameters 216 of the camera 201 are used as the field of view information obtained in step S306. In the present modification, the reference map change determination unit 222 generates an image by superimposing the virtual object on the image captured by the camera 201 based on the field of view information, and calculates the magnitude of variations in luminance between the display region of the virtual object and its vicinity. If the variations in luminance are smaller than a predetermined value, the reference map change determination unit 222 determines that the reference map 212 can be changed. If not, the reference map change determination unit 222 determines that the reference map 212 is not able to be changed.

A specific example will be described. The reference map change determination unit 222 initially generates a partial image by extracting pixels within a predetermined range around the display region of the virtual object in the image obtained by superimposing the object on the image captured by the camera 201. The reference map change determination unit 222 calculates a luminance gradient value of each pixel of the generated partial image. The reference map change determination unit 222 calculates the ratio of the number of pixels having a luminance gradient value greater than a predetermined value to the number of pixels of the partial image. If the calculated ratio is smaller than a predetermined value, the reference map change determination unit 222 determines that the reference map 212 can be changed. If not, the reference map change determination unit 222 determines that the reference map 212 is not able to be changed. The processing for generating the image by superimposing the virtual object on the image captured by the camera 201 here can be implemented by the same processing as that in which, in step S305, the image drawing unit 217 generates the image by superimposing the virtual object on the image obtained in step S303. Since the generated image is the same as that generated by the image drawing unit 217, the image generated by the image drawing unit 217 can be shared to save the amount of calculation, without the reference map change determination unit 222 generating a new image.

By determining that the reference map 212 can be changed only if the reference map 212 is determined to be able to be changed by both the method of the present exemplary embodiment or modification 1-1 and the method of modification 1-2, not only the geometric appearance but the optical appearance of the virtual object can also be taken into consideration. By doing so, the reference map 212 can be switched in timing when the virtual object blends well into the background as the timing when the user is unlikely to notice a change in the display position of the virtual object. Whether the reference map 212 can be changed may be determined only by the method of modification 1-2 without making a determination by the method of the present exemplary embodiment or modification 1-1.

Next, a second exemplary embodiment will be described. The first exemplary embodiment has described an example in which whether the reference map 212 can be changed is determined based on the static field of view information obtained in a certain point of time. However, whether the reference map 212 can be changed may be determined based on a change in the field of view information obtained in a time series. In the present exemplary embodiment, a moving speed of the display position of the virtual object is calculated as the change in the field of view information. If the magnitude of the calculated moving speed is greater than a predetermined value, the reference map 212 is determined to be able to be changed.

The user is more likely to notice a change occurring in the display position of the virtual object due to switching of the reference map 212 if the display position of the virtual object is stationary in the field of view. On the other hand, the user is less likely to notice the change if the display position of the virtual object is moving. Therefore, by changing the reference map 212 when the magnitude of the moving speed of the display position of the virtual object is large, the reference map 212 can be changed in timing when the user is unlikely to notice regardless of whether the virtual object lies in the field of view of the camera 201.

The present exemplary embodiment thus differs from the first exemplary embodiment mainly in the method for determining whether the reference map 212 can be changed. In the description of the present exemplary embodiment, parts similar to those of the first exemplary embodiment will be designated by the same reference numerals as in FIGS. 1 to 3. A detailed description thereof will be omitted. Specifically, the present exemplary embodiment and the first exemplary embodiment differ in the processing of step S307 in FIG. 3. An example of the processing of step S307 different from that of the first exemplary embodiment will be described below as processing of the information processing apparatus 100 according to the present exemplary embodiment.

(Step S307)

In step S307, the reference map change determination unit 222 determines whether the reference map 212 can be changed, based on the field of view information obtained in step S306. Here, the position and orientation of the camera 201, the position and orientation of the virtual object, the shape information about the virtual object (vertex information about polygons), and the internal parameters 216 of the camera 201 are used as the field of view information obtained in step S306. In the present exemplary embodiment, the reference map change determination unit 222 calculates the moving speed of the display position of the virtual object as a change in the field of view information based on the field of view information obtained in a time series. If the magnitude of the calculated moving speed of the display position of the virtual object is greater than a predetermined value, the reference map change determination unit 222 determines that the reference map 212 can be changed.

A specific example will be described. The reference map change determination unit 222 initially calculates a reference position of the virtual object. The reference map change determination unit 222 calculates maximum values and minimum values of the vertexes of the polygons expressing the shape of the virtual object on X-, Y-, and Z-axes, and divides the sums of the maximum and minimum values on the respective axes by 2 to calculate three-dimensional coordinates as the reference position of the virtual object. Next, the reference map change determination unit 222 calculates the relative position and orientation of the virtual object with respect to the camera 201 based on the position and orientation of the camera 201 and the position and orientation of the virtual object. The reference map change determination unit 222 then multiplies the reference position of the virtual object by the relative position and orientation of the virtual object and the internal parameter matrix of the camera 201 to project the virtual object onto the camera image projection plane. The two-dimensional position on the camera image projection plane is thereby obtained. The reference map change determination unit 222 assumes the obtained two-dimensional position to be the display position of the virtual object. The reference map change determination unit 222 calculates the display position of the virtual object a plurality of times in a time series to calculate the moving speed of the display position of the virtual object in the image captured by the camera 201. If the magnitude of the calculated moving speed is greater than a predetermined value, the reference map change determination unit 222 determines that the reference map 212 can be changed. If not, the reference map change determination unit 222 determines that the reference map 212 is not able to be changed.

As described above, in the present exemplary embodiment, the reference map 212 is determined to be able to be changed if the magnitude of the moving speed of the display position of the virtual object is large. Even if the virtual object lies in the field of view of the camera 201 for a long period of time, the reference map 212 can thus be switched in timing when a sense of incongruity given to the user is relatively small.

[Modification 2-1]

The present exemplary embodiment has described an example in which whether the reference map 212 can be changed is determined based on the moving speed of the display position of the virtual object on the camera image projection plane as a temporal change in the field of view information. However, the temporal change in the field of view information is not limited thereto. Whether the reference map 212 can be changed may be determined based on a change in the orientation of the virtual object as seen from the point of view of the camera 201. In the present modification, a change speed of the orientation of the virtual object is calculated as a change in the field of view information. The reference map 212 is determined to be able to be changed if the magnitude of the change speed of the orientation of the virtual object is greater than a predetermined value. The user is more likely to notice a change in the display position of the virtual object if the orientation of the virtual object is stationary in the field of view. On the other hand, the user is less likely to notice a change in the display position of the virtual object if the orientation of the virtual object is changing in the field of view. Therefore, by changing the reference map 212 when the magnitude of the change speed of the orientation of the virtual object is large, the reference map 212 can be changed in timing when the user is unlikely to notice even if the display position of the virtual object is not moving.

An example of the processing of step S307 different from that of the foregoing second exemplary embodiment will be described below as processing of the information processing apparatus 100 according to the present modification.

(Step S307)

In step S307, the reference map change determination unit 222 determines whether the reference map 212 can be changed, based on the field of view information obtained in step S306. Here, the position and orientation of the camera 201, the position and orientation of the virtual object, the shape information about the virtual object (vertex information about polygons), and the internal parameters 216 of the camera 201 are used as the field of view information obtained in step S306. In the present modification, the reference map change determination unit 222 calculates the change speed of the orientation of the virtual object as a change in the field of view information based on the field of view information obtained in a time series. If the magnitude of the calculated change speed of the orientation of the virtual object is greater than a predetermined value, the reference map change determination unit 222 determines that the reference map 212 can be changed.

A specific example will be described. The reference map change determination unit 222 multiples a rotation matrix representing the orientation out of the position and orientation of the virtual object by an inverse matrix of a rotation matrix representing the orientation out of the position and orientation of the camera 201. The reference map change determination unit 222 thereby obtains a rotation matrix representing a relative orientation of the virtual object with respect to the camera 201. The reference map change determination unit 222 calculates the rotation matrix representing the relative orientation to the point of view of the camera 201 a plurality of times in a time series to calculate the change speed of the orientation of the virtual object to the point of view of the camera 201 in the form of a rotation matrix. The reference map change determination unit 222 then transforms the rotation matrix into a rotation vector by Rodrigues's formula, and assumes the magnitude of the rotation vector to be the magnitude of the change speed of the orientation of the virtual object. If the magnitude of the calculated change speed of the orientation of the virtual object is greater than a predetermined value, the reference map change determination unit 222 determines that the reference map 212 can be changed. If not, the reference map change determination unit 222 determines that the reference map 212 is not able to be changed.

As described above, according to the present modification, the reference map 212 is determined to be able to be changed if the magnitude of the change speed of the orientation of the virtual object is large. Even if the display position of the virtual object is not moving, the reference map 212 can thus be switched in timing when the user is unlikely to notice.

Next, a third exemplary embodiment will be described. The first and second exemplary embodiments have described examples in which whether the reference map 212 can be changed is determined based only on the field of view information that is calculated by using the reference map 212 currently referred to. However, whether the reference map 212 can be changed may be determined by also using information about the reference map to be switched to (reference map switching candidate 213) to calculate the magnitude of a change in the appearance of the virtual object from the point of view of the camera 201 when the reference map 212 is actually switched. By actually calculating a change occurring in the appearance of the virtual object when the reference map 212 is switched, using the information about the reference map switching candidate 213 as well, the timing when a sense of incongruity given to the user is small can be detected without omission.

The present exemplary embodiment thus differs from the first and second exemplary embodiments mainly in the method for determining whether the reference map 212 can be changed. In the description of the present exemplary embodiment, parts similar to those of the first and second exemplary embodiments will be designated by the same reference numerals as in FIGS. 1 to 3. A detailed description thereof will be omitted.

In the present exemplary embodiment, a change occurring in the appearance of the virtual object when the reference map 212 is switched is calculated in the following manner. A display position of the virtual object in the image captured by the camera 201 is calculated based on the position and orientation of the camera 201 that are calculated by using the reference map 212 currently referred to. A display position of the virtual object in the image captured by the camera 201 is also calculated based on the position and orientation of the camera 201 that are calculated by using the reference map switching candidate 213. A difference between the display positions of the virtual object is then calculated as a change occurring in the appearance of the virtual object when the reference map 212 is switched. If the magnitude of the calculated difference in the display position of the virtual object is smaller than a predetermined value, the reference map 212 is determined to be able to be changed. If not, the reference map 212 is determined to be unable to be changed. Details of the present exemplary embodiment are described below.

Figure 4:
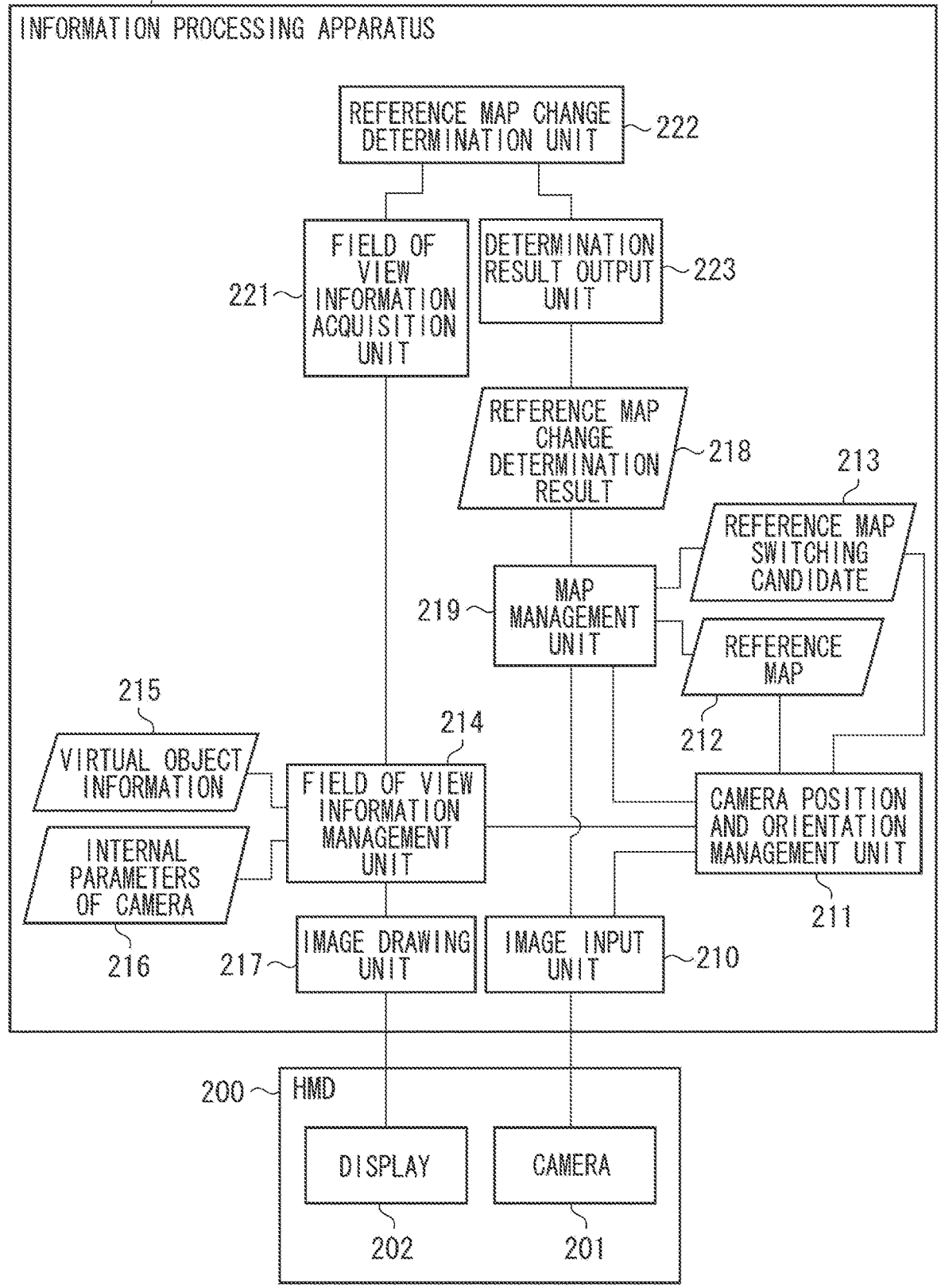
FIG. 4 is a diagram illustrating a second example of the configuration of the MR system.

FIG. 4 is a diagram illustrating an example of a module configuration of an information processing apparatus 400 according to the present exemplary embodiment and an MR system in which the information processing apparatus 400 is implemented. The functions of the components illustrated in FIG. 4 are not changes from those of the components illustrated in FIG. 2. Differences in the information exchanged between the components will be described here.

Like the first exemplary embodiment, the camera position and orientation management unit 211 stores a position and orientation of the camera 201 that are calculated by associating the frame image received by the image input unit 210 with the reference map 212. In addition, the camera position and orientation management unit 211 stores a position and orientation of the camera 201 that are calculated by associating the frame image with the reference map switching candidate 213. The field of view information management unit 214 has a function of aggregating and sequentially passing the two positions and orientations of the camera 201, the virtual object information 215, and the internal parameters 216 of the camera 201 to the image drawing unit 217 and the information processing apparatus 400 (field of view information acquisition unit 221).

FIG. 4 illustrates an example where the image input unit 210, the camera position and orientation management unit 211, the field of view information management unit 214, and the image drawing unit 217 are included in the information processing apparatus 400. However, at least some of these units may be included in an apparatus other than the information processing apparatus 400 (for example, the HMD 200).

Next, differences in the details of the processing of the information processing apparatus 400 according to the present exemplary embodiment from the first and second exemplary embodiments will be described with reference to the flowchart of FIG. 3.

(Step S304)

In step S304, the camera position and orientation management unit 211 associates the image obtained in step S303 with the reference map 212 to calculate a position and orientation of the camera 201 when the image is captured. The camera position and orientation management unit 211 also associates the image obtained in step S303 with the reference map switching candidate 213 to calculate a position and orientation of the camera 201 when the image is captured. The positions and orientations of the camera 201 are each calculated by the same method as described in the first exemplary embodiment.

(Step S306)

In step S306, the field of view information acquisition unit 221 obtains, from the field of view information management unit 214, field of view information for determining a change occurring in the appearance of the virtual object as seen from the point of view of the camera 201 when the reference map 212 is switched to the reference map switching candidate 213. The field of view information here includes the positions and orientations of the camera 201 calculated in step S304 (the positions and orientations of the camera 201 calculated by using the reference map 212 and the reference map switching candidate 213), the virtual object information 215, and the internal parameters 216 of the camera 201.

(Step S307)

In step S307, the reference map change determination unit 222 determines whether the reference map 212 can be changed, based on the field of view information obtained in step S306. In the present exemplary embodiment, the reference map change determination unit 222 calculates a display position of the virtual object in the image captured by the camera 201, by using the position and orientation of the camera 201 calculated by using the reference map 212 currently referred to. The reference map change determination unit 222 also calculates a display position of the virtual object in the image captured by the camera 201, by using the position and orientation of the camera 201 calculated by using the reference map switching candidate 213. If a difference between the display positions of the virtual object is smaller than a predetermined value, the reference map change determination unit 222 determines that the reference map 212 can be changed. If not, the reference map change determination unit 222 determines that the reference map 212 is not able to be changed. The reference map change determination unit 222 stores the determination result. The display positions of the virtual object are calculated, for example, by multiplying the position and orientation of the virtual object by inverse matrices of the respective positions and orientations of the camera 201 to calculate positions and orientations of the virtual object as seen from the respective points of view of the camera 201, and multiplying the positions and orientations of the virtual object by the internal parameter matrix of the camera 201.

As described above, in the present exemplary embodiment, the reference map 212 is determined to be able to be changed if a change occurring in the display position of the virtual object when the reference map 212 currently referred to is switched to the reference map switching candidate 213 is small. The reference map 212 can thus be switched by detecting the timing when a sense of incongruity given to the user is small without omission.

[Modification 3-1]

The present exemplary embodiment has described an example where the change occurring in the appearance of the virtual object when the reference map 212 is switched to the reference map switching candidate 213 is one occurring in the display position of the virtual object due to the switching of the reference map 212. However, the change occurring in the appearance of the virtual object when the reference map 212 is switched to the reference map switching candidate 213 is not limited thereto. Whether the reference map 212 can be changed may be determined based on a change occurring in a moving direction of the display position of the virtual object due to the switching of the reference map 212. The greater the difference between the moving direction of the display position of the virtual object attributable to the motion of the user wearing the HMD 200 and the moving direction of the display position of the virtual object attributable to the switching of the reference map 212 is, the more likely the following tendency is. That is, the user tends to be more likely to notice a change occurring in the display position of the virtual object due to the switching of the reference map 212. The reference map 212 is therefore determined to be able to be changed if an angle formed between the moving directions of the display position of the virtual object due to the motion of the user when the reference map 212 is not switched and when the reference map 212 is switched is smaller than a predetermined value. In such a manner, even if a change occurring in the display position of the virtual object due to the switching of the reference map 212 is large, the reference map 212 can be switched by detecting the timing when a sense of incongruity given to the user is small.

Differences of the processing of the information processing apparatus 400 according to the present modification from that of the foregoing third exemplary embodiment will be described with reference to the flowchart of FIG. 3.

(Step S307)

In step S307, the reference map change determination unit 222 determines whether the reference map 212 can be changed, based on the field of view information obtained in step S306. In the present modification, the reference map change determination unit 222 derives the moving direction of the display position of the virtual object in the image captured by the camera 201 when the reference map 212 currently referred to is not switched. The reference map change determination unit 222 also derives the moving direction of the display position of the virtual object in the image captured by the camera 201 when the reference map 212 is switched to the reference map switching candidate 213. If the angle formed between the two moving directions of the display position of the virtual object is smaller than a predetermined value, the reference map change determination unit 222 determines that the reference map 212 can be changed. If not, the reference map change determination unit 222 determines that the reference map 212 is not able to be changed.

As described above, in the present modification, whether the reference map 212 can be changed is determined based on a change occurring in the moving direction of the display position of the virtual object due to the switching of the reference map 212. Even if the amount of movement of the display position of the virtual object resulting from the switching of the reference map 212 is large, the reference map can thus be switched by detecting the timing when a sense of incongruity given to the user is relatively small.

Next, a fourth exemplary embodiment will be described. The first to third exemplary embodiments have described examples in which whether the reference map 212 can be changed is determined in consideration of the appearance of the virtual object as seen from the point of view of the camera 201. However, whether the reference map 212 can be changed may be determined from only the position and orientation of the camera 201. The user is less likely to notice a change in the display position of the virtual object if the user is changing the position and orientation of the camera 201 himself/herself. By switching the reference map 212 when a change in the position and orientation of the camera 201 is greater than a predetermine value, the reference map 212 can be switched in timing when a sense of incongruity given to the user is small.

The present exemplary embodiment thus differs from the first to third exemplary embodiments mainly in the method for determining whether the reference map 212 can be changed. In the description of the present exemplary embodiment, parts similar to those of the first to third exemplary embodiments will be designated by the same reference numerals as in FIGS. 1 to 4. A detailed description thereof will be omitted.

Figure 5:
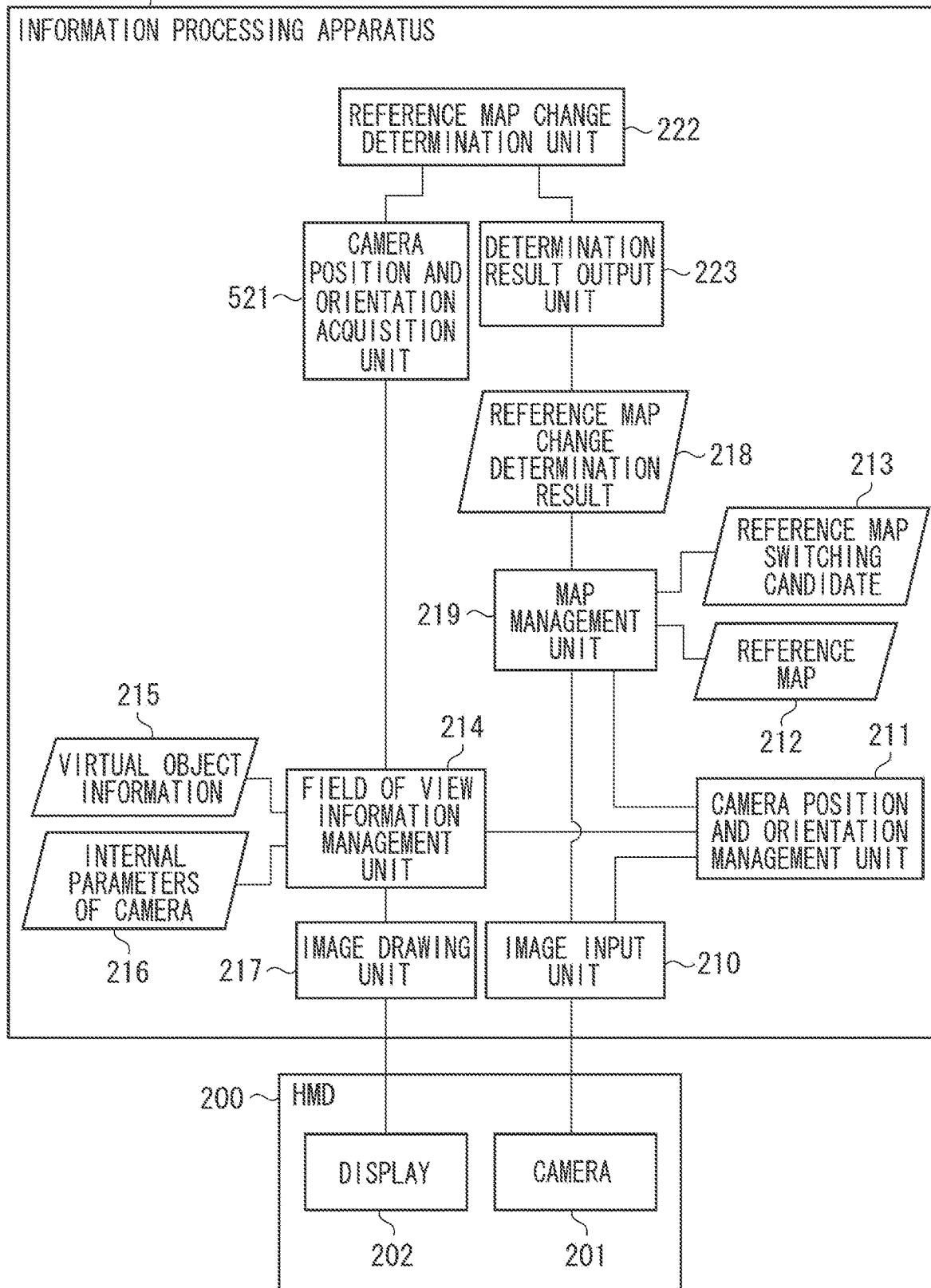
FIG. 5 is a diagram illustrating a third example of the configuration of the MR system.

FIG. 5 is a diagram illustrating an example of a module configuration of an information processing apparatus 500 according to the present exemplary embodiment and an MR system in which the information processing apparatus 500 is implemented. In the present exemplary embodiment, the field of view information acquisition unit 221 according to the first to third exemplary embodiments is replaced with a camera position and orientation acquisition unit 521. The camera position and orientation acquisition unit 521 obtains the position and orientation of the camera 201 from the field of view information management unit 214.

FIG. 5 illustrates an example where the image input unit 210, the camera position and orientation management unit 211, the field of view information management unit 214, and the image drawing unit 217 are included in the information processing apparatus 500. However, at least some of these units may be included in an apparatus other than the information processing apparatus 500 (for example, the HMD 200).

Figure 6:
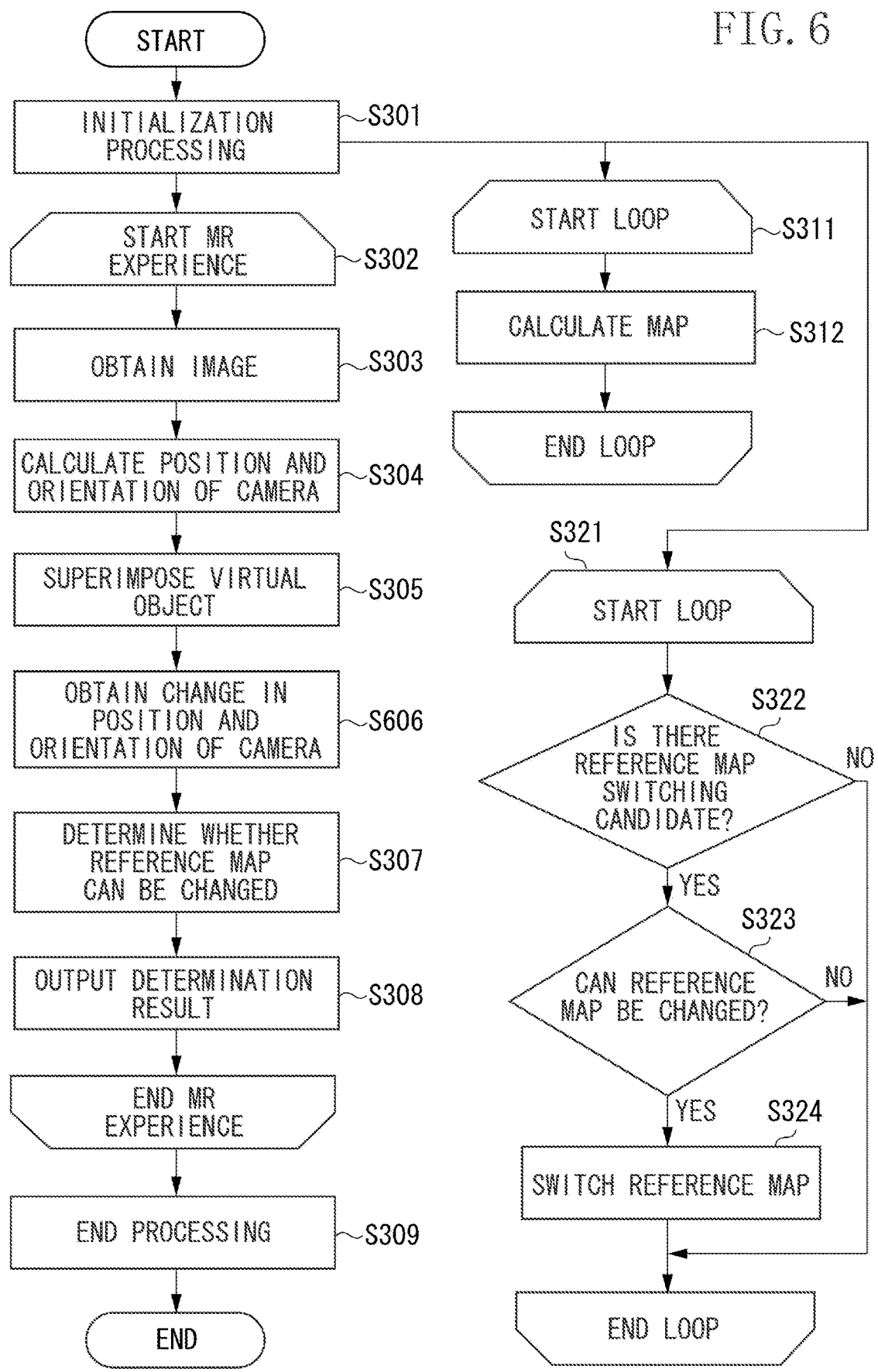
FIG. 6 is a flowchart illustrating a second example of the processing of the MR system.

FIG. 6 is a flowchart illustrating an example of processing of the MR system. In the present exemplary embodiment, step S606 is performed instead of step S303 according to the first to third exemplary embodiments. In step S606, the camera position and orientation acquisition unit 521 obtains, from the field of view information management unit 214, the change speed of the position and orientation of the camera 201 at the time when the image obtained in step S303 is captured. The change speed is calculated by the camera position and orientation management unit 211 from a time series of changes in the position and orientation of the camera 201, calculated in step S304. A specific example will be described. The camera position and orientation acquisition unit 521 obtains the magnitude of speed of a translation component and the magnitude of speed of a rotation component (angular speed) of the position and orientation of the camera 201.

In step S307, if the magnitude of the speed of the translation component and the magnitude of the speed of the rotation component of the position and orientation of the camera 201 are both greater than respective predetermined values, the reference map change determination unit 222 determines that the reference map 212 can be changed. If not, the reference map change determination unit 222 determines that the reference map 212 is not able to be changed.

As described above, in the present exemplary embodiment, the reference map 212 can be changed by detecting the timing when a sense of incongruity given to the user is small from limited information of only the position and orientation of the camera 201.

[Modification 4-1]

The present exemplary embodiment has described an example in which whether the reference map 212 can be changed is determined based on the change speed of the position and orientation of the camera 201 as a temporal change in the position and orientation of the camera 201. However, the temporal change in the position and orientation of the camera 201 is not limited thereto. Whether the reference map 212 can be changed may be determined based on the acceleration of change of the position and orientation of the camera 201 as a temporal change in the position and orientation of the camera 201. For example, in the moment of turning when the user wearing the HMD 200 makes a head-reciprocating motion, the user is less likely to be paying close attention to the virtual object even if the speed of the rotation component of the camera 201 is low. Therefore, if the magnitude of the acceleration of the position and orientation of the camera 201 is greater than a predetermined value, the reference map 212 is determined to be able to be changed. If not, the reference map 212 is determined to be unable to be changed.

A specific example will be described. The camera position and orientation acquisition unit 521 calculates the magnitude of the acceleration of the translation component and the magnitude of the acceleration of the rotation component (angular acceleration) from consecutive positions and orientations of the camera 201. If the magnitudes are both greater than respective predetermined values, the reference map change determination unit 222 determines that the reference map 212 can be changed. If not, the reference map change determination unit 222 determines that the reference map 212 is not able to be changed.

In such a manner, the reference map 212 can be switched in timing when the moving speed of the camera 201 is low and the user is unlikely to notice a change in the display position of the virtual object, like when the user turns back in motion.

Next, a fifth exemplary embodiment will be described. The first to fourth exemplary embodiments have described examples in which whether the reference map 212 can be changed is determined based on the point of view of the camera 201. However, if an attribute representing visibility of the virtual object changes with time, whether the reference map 212 can be changed may be determined from only the attribute representing the visibility of the virtual object, without using the point of view of the camera 201. The present exemplary embodiment describes an example of a method for determining whether the reference map 212 can be changed if transparency of the virtual object in an arbitrary time is described in the virtual object information 215 as a status representing the visibility of the virtual object. If the transparency of the virtual object is high, the user is less likely to notice a change in the display position of the virtual object. By switching the reference map 212 when the transparency of the virtual object is high, the reference map 212 can be switched in timing when a sense of incongruity given to the user is relatively small.

The present exemplary embodiment thus differs from the first to fourth exemplary embodiments mainly in the contents of the virtual object information 215 and the method for determining whether the reference map 212 can be changed. In the description of the present exemplary embodiment, parts similar to those of the first to fourth exemplary embodiments will be designated by the same reference numerals as in FIGS. 1 to 6. A detailed description thereof will be omitted.

Figure 7:
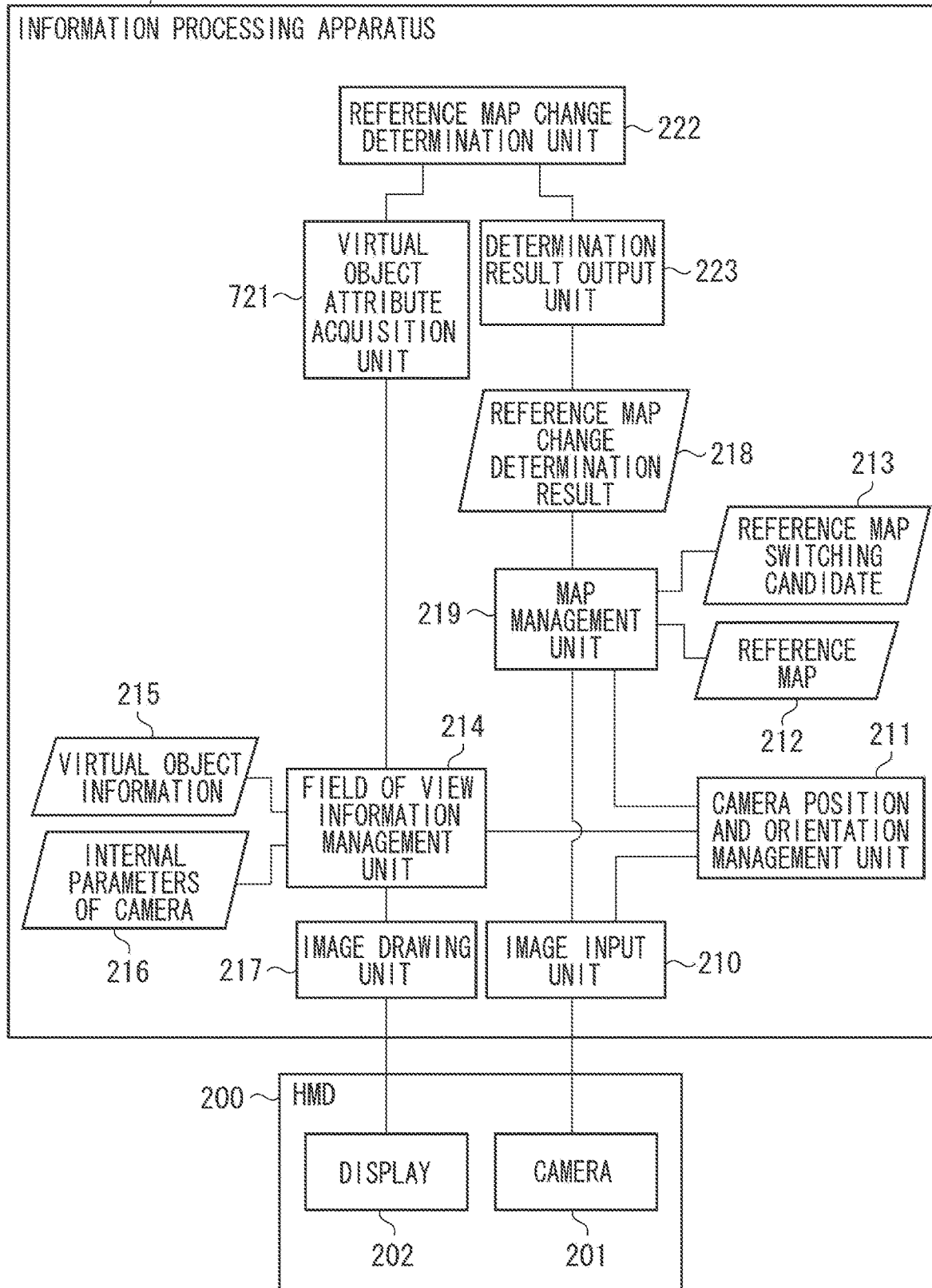
FIG. 7 is a diagram illustrating a fourth example of the configuration of the MR system.

FIG. 7 is a diagram illustrating an example of a module configuration of an information processing apparatus 700 according to the present exemplary embodiment and an MR system in which the information processing apparatus 700 is implemented. In the present exemplary embodiment, the field of view information acquisition unit 221 according to the first to third exemplary embodiments is replaced with a virtual object attribute acquisition unit 721. The virtual object attribute acquisition unit 721 obtains the value of the attribute of the virtual object included in the virtual object information 215 from the field of view information management unit 214.

FIG. 7 illustrates an example where the image input unit 210, the camera position and orientation management unit 211, the field of view information management unit 214, and the image drawing unit 217 are included in the information processing apparatus 700. However, at least some of these units may be included in an apparatus other than the information processing apparatus 700 (for example, the HMD 200).

Figure 8:
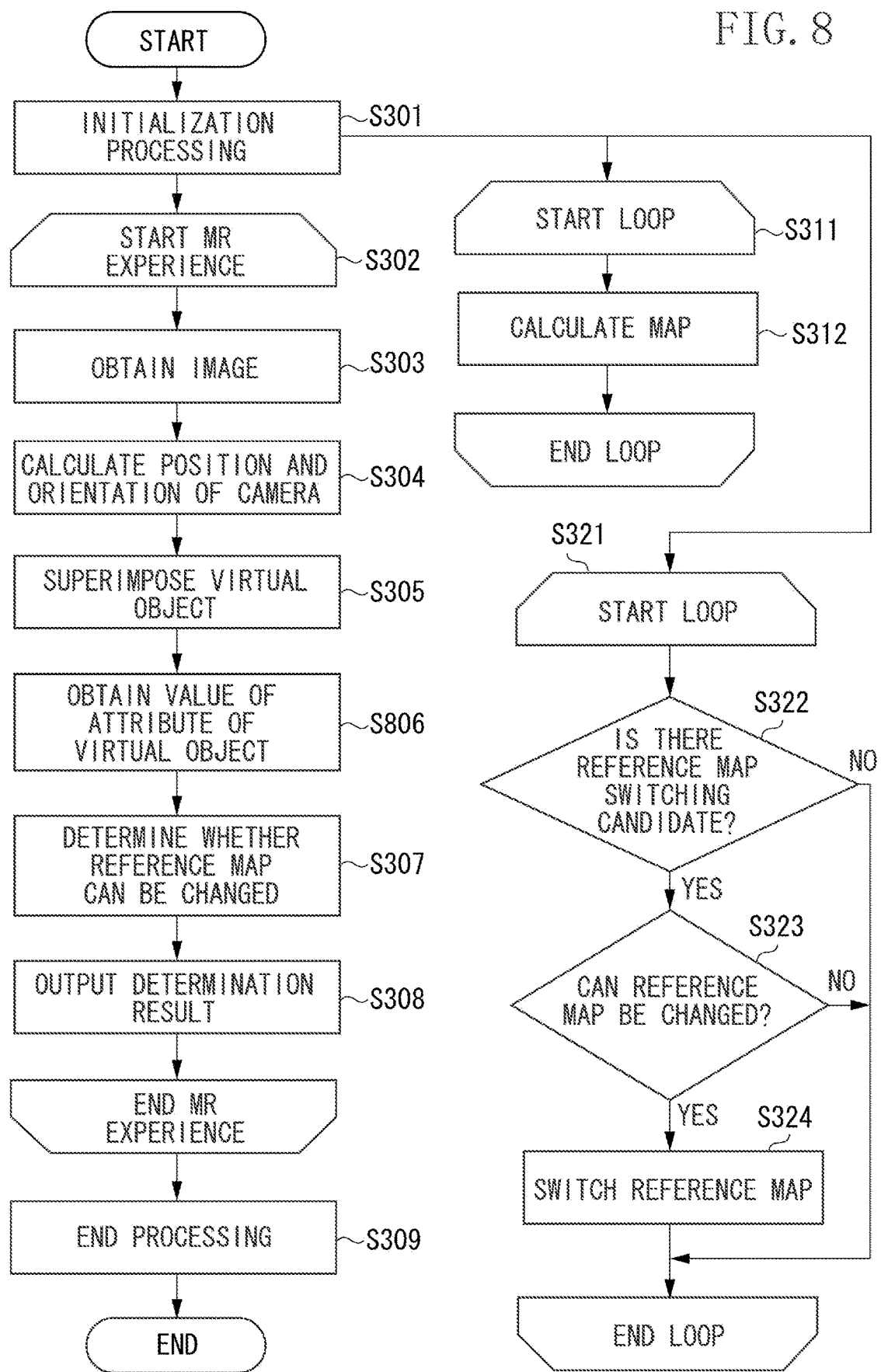
FIG. 8 is a flowchart illustrating a third example of the processing of the MR system.

FIG. 8 is a flowchart illustrating an example of processing of the MR system. In the present exemplary embodiment, step S806 is performed instead of step S306 according to the first to third exemplary embodiments. In step S806, the virtual object attribute acquisition unit 721 obtains the transparency of the virtual object at processing time from the field of view information management unit 214 as the value of the attribute of the virtual object.

In step S307, if the value of the attribute (transparency) obtained in step S806 is greater than a predetermined value (if the transparency is higher than the predetermined value), the reference map change determination unit 222 determines that the reference map 212 can be changed. If not, the reference map change determination unit 222 determines that the reference map 212 is not able to be changed.

As described above, in the present exemplary embodiment, the reference map 212 can be switched by detecting the timing when a sense of incongruity given to the user is small from limited information of only the attribute of the virtual object.

[Modification 5-1]

The present exemplary embodiment has described an example in which whether the reference map 212 can be changed is determined based on the transparency, an optical attribute, of the virtual object as the attribute representing the visibility of the virtual object. However, the attribute representing the visibility of the virtual object is not limited thereto. Whether the reference map 212 can be determined may be determined based on geometric information about the virtual object (for example, the moving speed of the virtual object in a global coordinate system) as the attribute representing the visibility of the virtual object. If the virtual object itself is in violent motion, the user is less likely to notice a change occurring in the display position of the virtual object due to a change of the reference map 212 regardless of the motion of the user. If the magnitude of the moving speed of the virtual object in the global coordinate system is greater than a predetermined value, the reference map 212 is then determined to be able to be changed. If not, the reference map 212 is determined to be unable to be changed. In such a manner, the reference map 212 can be changed in appropriate timing when a sense of incongruity given to the user is small.

Next, a sixth exemplary embodiment will be described. The first to fifth exemplary embodiments have described examples in which whether the reference map 212 can be changed is determined when the reference map 212 is switched to a generated new map. However, the map to be switched to does not necessarily need to be a generated new one. For example, suppose that a first map and a second map describing respective different spaces including an overlapping region are stored. Then, when the user moves from a region described by the first map to one described by the second map in the environment where the MR system is used, whether the reference map 212 is able to be changed can be determined by a method similar to those described in the foregoing exemplary embodiments in switching the reference map 212. Even in such an MR system of switching between a plurality of existing maps according to the user's action, the reference map 212 can be switched in timing when a sense of incongruity given to the user is small. The first to fifth exemplary embodiments have also described examples of switching the reference map 212. However, in the foregoing exemplary embodiments, not the timing to switch the reference map 212 but timing to perform correction processing or modification processing for making a correction or modification to a part of the reference map 212 may be determined.

Next, a seventh exemplary embodiment will be described. In the present exemplary embodiment, any two or more of the determination results of the change determination methods of the reference map 212, described in the first to fifth exemplary embodiments are combined to make a final determination about whether the reference map 212 can be changed. In such a manner, the change determination method of the reference map 212 can be adjusted according to the situation in which the MR system is used.

Specific examples include the following method. In the first exemplary embodiment, the reference map 212 is changed if the virtual object is not included in the field of view of the camera 201. In some situations where the virtual object is included in the field of view of the camera 201, the reference map 212 can also be determined to be able to be changed if the moving speed of the display position of the virtual object is greater than a predetermined value as described in the second exemplary embodiment. In such situations, the logical sum of the results of the respective determination methods described in the first and second exemplary embodiments is used as a final determination result.

Other specific examples include the following method. As described in modification 1-1, the reference map 212 is changed if the display position of the virtual object is far from the center of the plane of projection of the camera 201. To further reduce the sense of incongruity given to the user, a high moving speed of the display position of the virtual object may also be used as an additional condition as described in the second exemplary embodiment. In such a situation, the logical AND of the results of the respective determination methods described in modification 1-1 and the second exemplary embodiment is used as a final determination result. Similarly, the logical sum or logical AND of other methods described in the first to fifth exemplary embodiments may be obtained to set various conditions. The present exemplary embodiment may be applied to the sixth exemplary embodiment.

As described above, the determination results of a plurality of determination methods may be combined to set a condition for determining whether the reference map 212 can be changed, according to the situation in which the MR system is used.

CONCLUSION

In the foregoing exemplary embodiments, the field of view information obtained by the field of view information acquisition unit 221 may be information representing an appearance of the virtual object as seen from the point of view of the camera 201. An example is the combination of the position and orientation of the camera 201, the position and orientation of the virtual object, the shape information about the virtual object, and the internal parameters 216 of the camera 201 described as the field of view information obtained in the first exemplary embodiment. As described in modification 1-2, the field of view information may further include the optical information about the virtual object. In such a case, the optical information can also be taken into consideration to detect the timing to switch the reference map 212 with fewer omissions.

In the foregoing exemplary embodiments, the reference map change determination unit 222 may use any method as long as the reference map 212 is determined to be able to be changed when the user is unlikely to notice a change that can occur in the appearance of the virtual object due to the change of the reference map 212, based on the field of view information. An example is a method for determining the reference map 212 to be able to be changed if the virtual object is not visible to the camera 201 based on the static appearance of the virtual object from the point of view of the camera 201, obtained from the field of view information.

Specifically, as described in the first exemplary embodiment, the reference map 212 may be determined to be able to be changed if the virtual object is not included in the field of view of the camera 201. As described in modification 1-1, the reference map 212 may be determined to be able to be changed if the ratio of the display region of the virtual object to the image captured by the camera 201 is small. Other examples include a method for determining the reference map 212 to be able to be changed if the amount of change in the appearance of the virtual object as seen from the point of view of the camera 201, obtained from the field of view information, is large. Specifically, as described in the second exemplary embodiment, the reference map 212 may be determined to be able to be changed if the amount of change per unit time of the display position of the virtual object in the image captured by the camera 201 is large. As described in modification 2-1, the reference map 212 may be determined to be able to be changed if the amount of change per unit time of the orientation of the virtual object as seen from the point of view of the camera 201 is large. Other examples include a method for calculating the amount of change per unit time occurring in the appearance of the virtual object in the image captured by the camera 201 when a predetermined modification is actually made to the reference map 212, and determining the reference map 212 to be able to be changed if the calculated amount of change is small. Specifically, as described in the third exemplary embodiment, the reference map 212 may be determined to be able to be changed if the amount of change per unit time occurring in the display position of the virtual object in the image captured by the camera 201 due to the change of the reference map 212 is small. As described in modification 3-1, the reference map 212 may be determined to be able to be changed if a change occurring in the moving direction of the display position of the virtual object in the image captured by the camera 201 due to the change of the reference map 212 is small.

The foregoing are examples of variations of the determination methods when the field of view information includes only the arrangement and geometric information about the camera 201 and the virtual object. However, the field of view information is not limited thereto. For example, if the field of view information includes the optical information about the virtual object, the determination method described in modification 1-2 may also be employed. That is, the reference map 212 may be determined to be able to be changed if the virtual object superimposed on the image captured by the camera 201 blends well into the surrounding background.

The information used to determine whether the reference map 212 can be changed may be an evaluation index for evaluating the user's unlikeliness to notice a change occurring in the appearance of the virtual object in the image captured by the camera 201 when the reference map 212 is changed to another map. An example is the information representing the appearance of the virtual object as seen from the point of view of the camera 201 as described in the first to third exemplary embodiments. Other examples include a method for determining the reference map 212 to be able to be changed if a change in the position and orientation of the camera 201 per unit time is large. Specifically, as described in the fourth exemplary embodiment, the reference map 212 may be determined to be able to be changed if the magnitude of the change speed of the position and orientation of the camera 201 is large. As described in modification 4-1, the reference map 212 may be determined to be able to be changed if the magnitude of the acceleration of change of the position and orientation of the camera 201 is large. Other examples include the value of the attribute representing the visibility of the virtual object. In such a case, the reference map 212 is determined to be able to be changed if the visibility of the virtual object is low.

The value of the attribute representing the visibility of the virtual object may be a value by which the user's likeliness to notice a change occurring in the display position of the virtual object due to the change of the reference map 212 can be evaluated. An example is the transparency of the virtual object (if the transparency is high, the visibility is low and the user is less likely to notice a change in the display position of the virtual object) as described in the fifth exemplary embodiment. Other examples include the moving speed of the virtual object itself (the higher the moving speed of the virtual object is, the lower the visibility is and the less likely the user is to notice a change in the display position of the virtual object) as described in modification 5-1.

The foregoing exemplary embodiments are to be considered in all aspects as illustrative of examples, and not restrictive of the technical scope, and may be implemented in various forms without departing from the technical concept or essential characteristics thereof.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the scope of the following claims is to be accorded the broadest interpretation so as to encompass all such modifications and equivalent structures and functions.

This application claims the benefit of Japanese Patent Application No. 2015-257146, filed Dec. 28, 2015, which is hereby incorporated by reference herein in its entirety.

What is claimed is:

1. An information processing apparatus for performing processing for superimposing a virtual object on an image captured by an imaging apparatus based on a result of association between a map and the image, the map representing an arrangement, in a space in which the image is captured, of an indicator being associated with an indicator included in an image which is captured, and used for estimating a position and orientation of the imaging apparatus, the information processing apparatus comprising:
   one or more processors; and
   one or more memories storing instructions, when executed by the one or more processors, causing the information processing apparatus to function as:
   an acquisition unit configured to obtain an evaluation indicator that is an indicator for evaluating the appearance of the virtual object superimposed on the image captured by the imaging apparatus,
   wherein the evaluation indicator includes at least any one of information representing the appearance of the virtual object as seen from a point of view of the imaging apparatus, information indicating motion of the imaging apparatus, and information indicating an attribute representing visibility of the virtual object;
   a determination unit configured to determine whether the map that is an existing map is able to be changed to a newly generated map, which is generated by measuring the space, based on the evaluation indicator for the existing map and estimated change of the evaluation indicator for the newly generated map; and
   a changing unit configured to change the map to the newly generated map in case where the determination unit determines that the map is able to be changed to the newly generated map.

2. The information processing apparatus according to claim 1, wherein the determination unit is configured to make a determination about whether the virtual object is included in an imaging range of the imaging apparatus, based on the information representing the appearance of the virtual object as seen from the point of view of the imaging apparatus, and determine whether the map is able to be changed, based on the determination.

3. The information processing apparatus according to claim 1, wherein the determination unit is configured to derive a ratio of a region of the virtual object to a region of the image when the virtual object is superimposed on the image, based on the information representing the appearance of the virtual object as seen from the point of view of the imaging apparatus, and determine whether the map is able to be changed, based on a result of comparison between the derived ratio and a predetermined value.

4. The information processing apparatus according to claim 1, wherein the information representing the appearance of the virtual object as seen from the point of view of the imaging apparatus includes optical information about the virtual object, and
wherein the determination unit is configured to determine whether the map is able to be changed, based on a result of comparison between a value indicated by the optical information about the virtual object and a predetermined value.

5. The information processing apparatus according to claim 1, wherein the information representing the appearance of the virtual object as seen from the point of view of the imaging apparatus includes information representing a temporal change of the virtual object on a plane of projection of the image, and
wherein the determination unit is configured to determine whether the map is able to be changed, based on the information representing the temporal change of the virtual object on the plane of projection of the image.

6. The information processing apparatus according to claim 1, wherein information representing a temporal change of the virtual object on a plane of projection of the image includes at least either one of a moving speed of a display position of the virtual object and a change speed of an orientation of the virtual object, and
wherein the determination unit is configured to determine whether the map is able to be changed, based on a result of comparison between at least either one of the moving speed of the display position of the virtual object and the change speed of the orientation of the virtual object and a predetermined value.

7. The information processing apparatus according to claim 1, wherein the acquisition unit is configured to obtain the evaluation indicator that is an indicator for evaluating the appearance of the virtual object superimposed on the image by using the map that has not been changed yet, and the evaluation indicator that is an indicator for evaluating an appearance of the virtual object superimposed on the image by using a candidate map to be changed, and
wherein the determination unit is configured to determine whether the map is able to be changed, based on the evaluation indicator by using the map that has not been changed yet and estimated change of the evaluation indicator by using the candidate map to be changed.

8. The information processing apparatus according to claim 7, wherein the evaluation indicator includes at least either one of a display position of the virtual object and a moving direction of the display position of the virtual object.

9. The information processing apparatus according to claim 1, wherein the information indicating the attribute representing the visibility of the virtual object includes at least either one of optical information about the virtual object and geometric information about the virtual object.

10. The information processing apparatus according to claim 1, wherein the information indicating the motion of the imaging apparatus includes information indicating a temporal change in a position and orientation of the imaging apparatus, and
wherein the determination unit is configured to determine whether the map is able to be changed, based on a result of comparison between the temporal change in the position and orientation of the imaging apparatus and a predetermined value.

11. The information processing apparatus according to claim 10, wherein the information indicating the temporal change in the position and orientation of the imaging apparatus includes at least either one of a change speed and acceleration of the position and orientation of the imaging apparatus.

12. The information processing apparatus according to claim 1, wherein if the determination unit determines that the map is able to be changed, either the current map is switched to a new map or a correction or modification is made to a part of the current map.

13. An information processing apparatus for performing processing for superimposing a virtual object on an image captured by an imaging apparatus based on a result of association between a map and the image, the map representing an arrangement, in a space in which the image is captured, of an indicator being associated with an indicator in an image which is captured, and used for estimating a position and orientation of the imaging apparatus, the information processing apparatus comprising:
one or more processors; and
one or more memories storing instructions, when executed by the one or more processors, causing the information processing apparatus to function as:
an acquisition unit configured to obtain an evaluation indicator that is an indicator for evaluating the appearance of the virtual object superimposed on the image captured by the imaging apparatus,
wherein the evaluation indicator includes at least any one of information representing the appearance of the virtual object as seen from a point of view of the imaging apparatus, information indicating motion of the imaging apparatus, and information indicating an attribute representing visibility of the virtual object;
a determination unit configured to determine whether the map that is an existing map is able to be changed to a newly generated map, which is generated by measuring the space, based on a temporal change comparison between the evaluation indicator of the existing map and the evaluation indicator of the newly generated map; and
a changing unit configured to change the map to the newly generated map in case where the determination unit determines that the map is able to be changed to the newly generated map.

14. An information processing method for performing processing for superimposing a virtual object on an image captured by an imaging apparatus based on a result of association between a map and the image, the map indicating an arrangement, in a space in which the image is captured, of an indicator being associated with an indicator in an image which is captured, and used for estimating a position and orientation of the imaging apparatus, the information processing method comprising:

obtaining an evaluation indicator that is an indicator for evaluating the appearance of the virtual object superimposed on the image captured by the imaging apparatus,
  wherein the evaluation indicator includes at least any one of information representing the appearance of the virtual object as seen from a point of view of the imaging apparatus, information indicating motion of the imaging apparatus, and information indicating an attribute representing visibility of the virtual object;
  determining whether the map that is an existing map is able to be changed to a newly generated map, which is generated by measuring the space, based on the evaluation indicator for the existing map and estimated change of the evaluation indicator for the newly generated map; and
  changing the map to the newly generated map in case where the determination unit determines that the map is able to be changed to the newly generated map.

15. An information processing method for performing processing for superimposing a virtual object on an image captured by an imaging apparatus based on a result of association between a map and the image, the map representing an arrangement, in a space in which the image is captured, of an indicator being associated with an indicator in an image which is captured, and used for estimating a position and orientation of the imaging apparatus, the information processing method comprising:
  obtaining an evaluation indicator that is an indicator for evaluating the appearance of the virtual object superimposed on the image captured by the imaging apparatus,
  wherein the evaluation indicator includes at least any one of information representing the appearance of the virtual object as seen from a point of view of the imaging apparatus, information indicating motion of the imaging apparatus, and information indicating an attribute representing visibility of the virtual object;
  determining whether the map that is an existing map is able to be changed to a newly generated map, which is generated by measuring the space, based on a temporal change comparison between the evaluation indicator of the existing map and the evaluation indicator of the newly generated map; and
  changing the map to the newly generated map in case where the determination unit determines that the map is able to be changed to the newly generated map.

16. A non-transitory computer-readable medium storing a program for causing a computer to function as units of an information processing apparatus for performing processing for superimposing a virtual object on an image captured by an imaging apparatus based on a result of association between a map and the image, the map representing an arrangement, in a space in which the image is captured, of an indicator being associated with an indicator in an image which is captured, and used for estimating a position and orientation of the imaging apparatus, the information processing apparatus including:
  an acquisition unit configured to obtain an evaluation indicator that is an indicator for evaluating the appearance of the virtual object superimposed on the image captured by the imaging apparatus,
  wherein the evaluation indicator includes at least any one of information representing the appearance of the virtual object as seen from a point of view of the imaging apparatus, information indicating motion of the imaging apparatus, and information indicating an attribute representing visibility of the virtual object;
  a determination unit configured to determine whether the map that is an existing map is able to be changed to a newly generated map, which is generated by measuring the space, based on the evaluation indicator for the existing map and estimated change of the evaluation indicator for the newly generated map; and
  a changing unit configured to change the map to the newly generated map in case where the determination unit determines that the map is able to be changed to the newly generated map.

17. A storage non-transitory computer-readable medium storing a program for causing a computer to function as units of an information processing apparatus for performing processing for superimposing a virtual object on an image captured by an imaging apparatus based on a result of association between a map and the image, the map representing an arrangement, in a space in which the image is captured, of an indicator being associated with an indicator in an image which is captured, and used for estimating a position and orientation of the imaging apparatus, the information processing apparatus including:
  an acquisition unit configured to obtain an evaluation indicator that is an indicator for evaluating the appearance of the virtual object superimposed on the image captured by the imaging apparatus,
  wherein the evaluation indicator includes at least any one of information representing the appearance of the virtual object as seen from a point of view of the imaging apparatus, information indicating motion of the imaging apparatus, and information indicating an attribute representing visibility of the virtual object;
  a determination unit configured to determine whether the map that is an existing map is able to be changed to a newly generated map, which is generated by measuring the space, based on a temporal change comparison between the evaluation indicator of the existing map and the evaluation indicator of the newly generated map; and
  a changing unit configured to change the map to the newly generated map in case where the determination unit determines that the map is able to be changed to the newly generated map.

* * * * *